United States Patent [19]

Allen

[11] Patent Number: 4,596,074
[45] Date of Patent: Jun. 24, 1986

[54] CURVILINEAR MEASURING DEVICE, AND METHODS OF CONSTRUCTING AND UTILIZING SAME

[76] Inventor: Philip J. Allen, 10151 Murch Dr., Alpena, Mich. 49707

[21] Appl. No.: 700,296

[22] Filed: Feb. 11, 1985

[51] Int. Cl.$^4$ ............................................. G01B 7/12
[52] U.S. Cl. ............................... 33/178 D; 33/169 B
[58] Field of Search ............. 33/178 D, 178 R, 143 L, 33/169 B

[56] References Cited

U.S. PATENT DOCUMENTS

| | | | |
|---|---|---|---|
| 878,439 | 2/1908 | Wagniere | 33/178 D |
| 4,143,267 | 3/1979 | Johnson et al. | 33/143 L |

FOREIGN PATENT DOCUMENTS 203444  12/1907  Fed. Rep. of Germany ... 33/178 D

*Primary Examiner*—Willis Little
*Attorney, Agent, or Firm*—Irving M. Weiner; Joseph P. Carrier; John J. Cantarella

[57] ABSTRACT

A curvilinear measuring device having a base plate containing a retaining tapered track in which a slide member moves. On top of the slide member is a digital readout device with a lit LCD on top. The slide device can be removed in turn end for end for making concave measurements. A contact ball moves along the track and electronically changes the voltage which is digitally displayed.

15 Claims, 5 Drawing Figures

U.S. Patent   Jun. 24, 1986   4,596,074

CURVILINEAR MEASURING DEVICE, AND METHODS OF CONSTRUCTING AND UTILIZING SAME

BACKGROUND OF THE INVENTION

1. Field of the Invention

The present invention relates generally to a device for rapidly measuring the radius of curvature of convex or concave items.

More particularly, the present invention relates to a curved surface measuring device which is a hand held unit made of plastic or stainless steel, and which may contain a LCD (liquid crystal display) which will directly display the radius of the curved surface measured in inches or centimeters as selected. The LCD may be programmable to display the radius in feet or meters, the diameter and circumference (of the circle of which the curved surface is a part), and the length of the curved surface intersected by a secant of given or measured length.

2. Description of Relevant Art

The prior art and conventional devices have not been successful in providing a small hand held device which accurately measures curved surfaces and displays the result substantially.

Illustrative of the relevant art are: Sutterlin U.S. Pat. No. 1,971,928 entitled "STRADDLE DIAL MICROMETER"; Harris U.S. Pat. No. 3,439,430 entitled "ARC-MEASURING GAUGE FOR USE WITH CYLINDRICAL OBJECTS"; Strasbaugh U.S. Pat. No. 3,848,339 entitled "CYLOMETER"; and Balogh et al U.S. Pat. No. 4,389,788 entitled "APPARATUS AND METHOD FOR MEASURING ROLL DIAMETERS."

SUMMARY OF THE INVENTION

The present invention provides a curvilinear measuring device comprising first means having a predetermined single unitary substantially flat surface for contacting at at least one first point an external curved item to be measured. The device also includes second means for contacting at at least one second point the external curved item to be measured. The second means is operably and selectively interconnected with and linearly translatable with respect to the first means in a predetermined direction which is substantially perpendicular to the predetermined single unitary substantially flat surface of the first means. The device also includes third means operably and selectively interconnected with the first and second means for determining the distance between the first and second points in the mentioned predetermined direction.

An object of the present invention is to provide a curvilinear measuring device as described above, and methods of constructing and utilizing such device.

Another object of the invention is to provide such a measuring device having a twin pointed end for exterior or convex measurements, and an oppositely disposed single pointed end for internal or concave measurements.

A further object of the invention is to provide such a measuring device having a base plate which contains and retains a tapered track in which a slide device moves. A digital readout device is positioned directly over a pickup device which is located on the exact center of the slide device.

Another object of the invention is to provide a curvilinear measuring device which can measure curved surfaces thousands of feet in diameter, and can be used on either concave or convex surfaces.

Further objects and details of the present invention will become apparent to those skilled in the art upon reading the following description, appended claims, and the accompanying drawings.

DETAILED DESCRIPTION OF PREFERRED EMBODIMENTS

With reference to FIGS. 1-5, there is described a preferred embodiment of the present invention.

The curvilinear measuring device includes first means, such as a base plate 10, having a predetermined single unitary substantially flat surface 12 for contacting at at least one first point, such as point Q, an external curved item, such as circle or cylinder S (FIG. 5), to be measured. Surface 12 may be considered at the front end of base plate 10, whereas surface 14 may be considered at the back end of base plate 10.

The curvilinear measuring device also includes second means, such as a slide device 16, for contacting at at least one second point, such as points F and H (FIG. 5) the circle or cylinder S to be measured. The slide device 16 is operably and selectively interconnected with and linearly translatable with respect to the base plate 10 in a predetermined direction (left to right as viewed in FIGS. 1 and 2, or along the line MBE as viewed in FIG. 5) which is substantially perpendicular to the flat surface 12.

Figure 4:
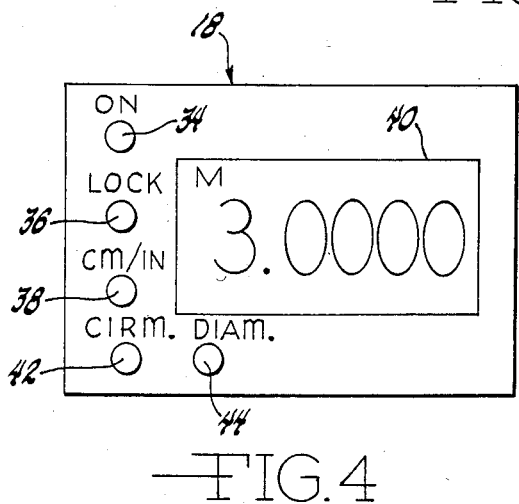
FIG. 4 illustrates a top plan view of the digital readout device, liquid crystal display and microprocessor.

The curvilinear measuring device also includes third means, such as a digital readout/microprocessor device 18, which is operably and selectively interconnected with base plate 10 and slide device 16 for determining the distance (such as JH, KF or DE shown in FIG. 5) between the first and second points in the predetermined direction. An LCD at the top surface of digital readout/microprocessor device 18 is illustrated in FIG. 4. The readout device 18 is affixed to slide device 16, and is positioned directly over a pickup device 20 which is located at the exact center of slide device 16.

Figure 2:
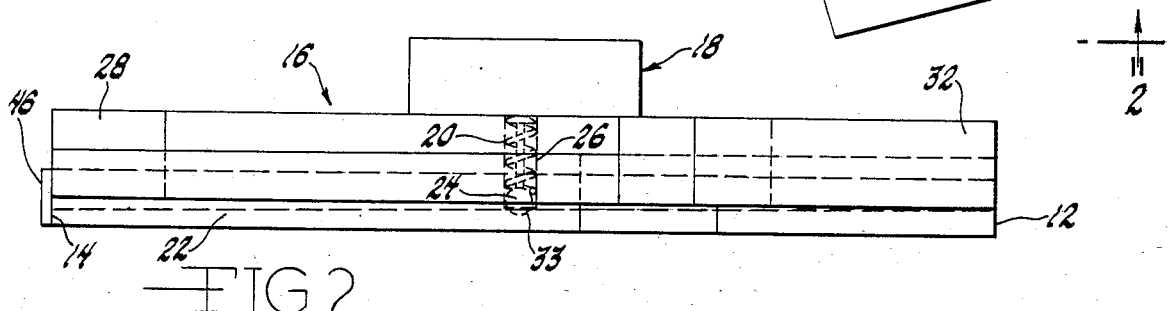
FIG. 2 illustrates a side elevational view taken along the line 2—2 shown in FIG. 1.

With particular reference to FIG. 2, the base plate 10 is provided with a central tapered track 22 which, for the preferred embodiment illustrated, has a 1/32 of an inch upwardly inclined taper from back surface 14 to front surface 12. For the preferred embodiment described, the distance from front flat surface 12 to back surface 14 is 6¼ inches. As the slide device 16 is moved from its midpoint (zero) position towards the front, a contact ball 24 moves up in its channel 26 towards the digital readout device 18. As the contact ball 24 moves upwardly, it moves a linear potentiometer (not shown).

This adjusts the voltage to an integrated circuit (not shown) which changes the digital readout accordingly.

The slide device 16 can be removed from the base plate 10, and turned end for end to facilitate concave measurements. The slide device 16 has a single pointed end 28 for internal or concave measurements, and a twin pointed end with tines 30 and 32 for exterior or convex measurements. Preferably, but not necessarily, all parts of the device may be made of stainless steel.

A conical detent 33 is provided at the midpoint of track 22 for accommodating contact ball 24 for ease of positioning slide device 16 at its midpoint (zero) position.

Figure 5:
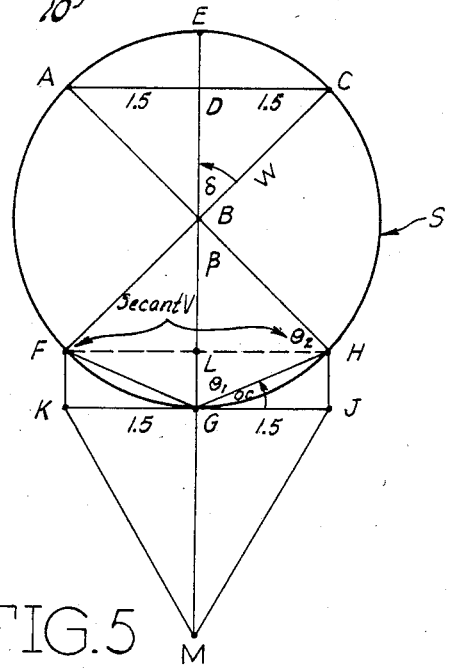
FIG. 5 depicts a diagrammatic drawing to illustrate the calculations of the derivation of the principle which governs the relationship between the measured distance and the radius of the curved surface to be measured in accordance with the present invention.

In operation, the curvilinear measuring device with its slide device 16 in its center zero position is set up against a curved surface S with its front flat surface 12 touching the curve at point Q, which is the equivalent of point G shown in FIG. 5. If the curve S is convex, the two tines 30 and 32 will be up front. The "ON" button 34 (FIG. 4) is then depressed. This turns on the digital readout 40. Care should be taken to assure that the slide device 16 is in its center-zero position.

The slide device 16 is then moved to touch the curve S with the point of both tines 30 and 32, as shown in FIG. 5 as points F and H. This automatically centers point Q or G. The "LOCK" button 36 is depressed next to lock the measurement on the digital readout and commit it to memory. Centimeters or inches can be selected as desired utilizing the button 38.

Once the measurement is in memory, an "M" appears in the upper left corner of the readout 40. The circumference or diameter functions can be used via the buttons 42 and 44 once the measurement is in memory.

The measurement of a concave curve is very similar. The difference is that the single pointed end 28 is positioned at the front. With the slide device 16 at its center zero position, the front flat surface 12 is set against the circle S, as at points A and C as shown in FIG. 5. The slide device 16 is then moved until the point 28 touches the circle S, as at point E shown in FIG. 5.

Figure 1:
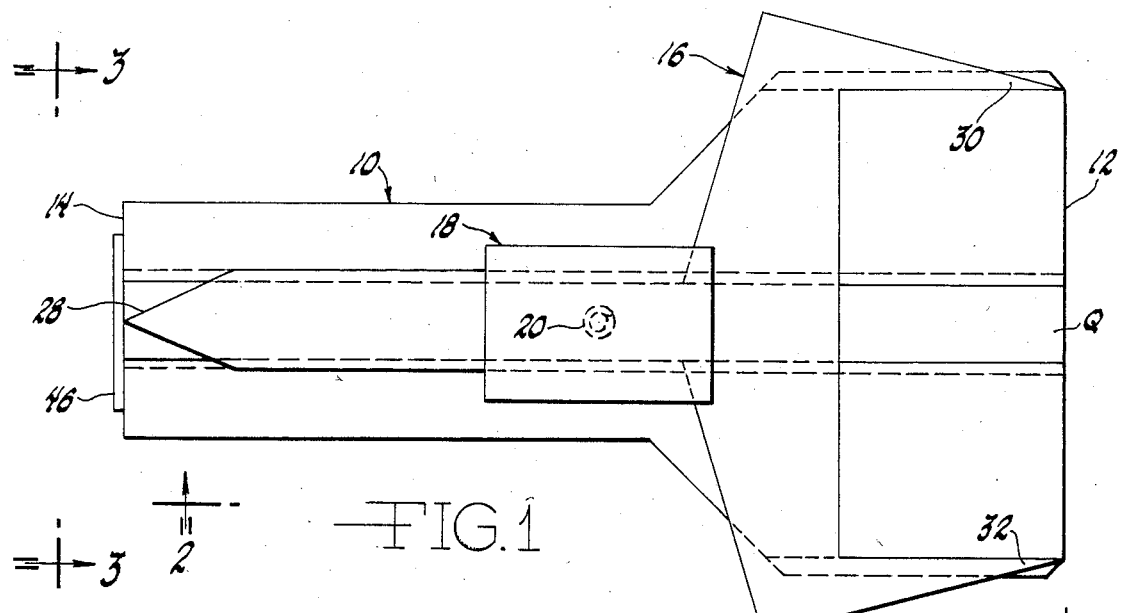
FIG. 1 illustrates a top plan view of a preferred embodiment of the present invention.
Figure 3:
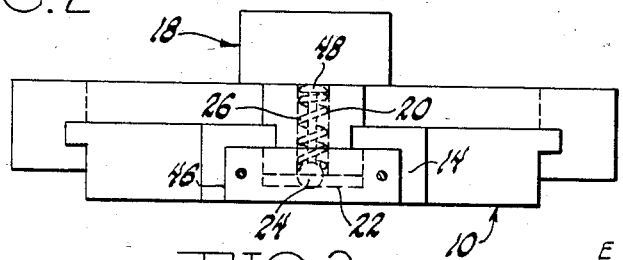
FIG. 3 illustrates a back elevational view taken along the line 3—3 shown in FIG. 1.

There is shown in FIGS. 1, 2 and 3 an end cap 46. It should also be noted that the contact ball 24 is spring loaded downwardly, and has a central connecting rod 48.

The preferred embodiment described above, has a dimension of 3 inches between the point of tines 30 and 32. With respect to this particular preferred embodiment, and also with respect to FIG. 5, the derivation of the principle which governs the relationship between the measured distance and the radius of the curved surface to be measured will be described hereinbelow.

The curved surface to be measured is a portion of circle S. The measured distance is HJ.

let $HJ = X$ and $GH = Y$

Then because triangle GHJ is a right triangle, $$X^2 + (1.5)^2 = Y^2$$

$$Y = \sqrt{X^2 + 2.25}, \text{ angle } \alpha = \sin^{-1}\left(\frac{X}{\sqrt{X^2 + 2.25}}\right)$$

$$\text{angle } \theta_1 = 90° - \sin^{-1}\left(\frac{X}{\sqrt{X^2 + 2.25}}\right)$$

angle $\beta = 180° - 2\theta$ because triangle BGH is an isosceles triangle, and therefore $\theta_1 = \theta_2 = \theta$ $$\beta = 180 - 2\theta = 180° - 2\left[90° - \sin^{-1}\left(\frac{X}{\sqrt{X^2 + 2.25}}\right)\right]$$

trigonometric sin law states:

$$BG \sin \beta = Y \sin \theta$$

therefore:

$$BG = Y \sin \theta / \sin \beta$$

then $$BG = \frac{\left[(\sqrt{X^2 + 2.25}) \sin\left[90° - \sin^{-1}\left(\frac{X}{\sqrt{X^2 + 2.25}}\right)\right]\right]}{\left[\sin\left[180° - 2\left(90° - \sin^{-1}\left(\frac{X}{\sqrt{X^2 + 2.25}}\right)\right)\right]\right]}$$

given trigonometric laws:

$$\sin(90° - \gamma) = \cos \gamma, \text{ and } \sin^2\gamma + \cos^2\gamma = 1$$

let $\sin^{-1}\left(\frac{X}{\sqrt{X^2 + 2.25}}\right) = \gamma$, then $\sin\gamma = \frac{X}{\sqrt{X^2 + 2.25}}$ and $\sin^2\gamma = \frac{X^2}{X^2 + 2.25}$ Then $\frac{X^2}{X^2 + 2.25} + \cos^2\gamma = 1; \cos^2\gamma = 1 - \frac{X^2}{X^2 + 2.25} =$ $$\frac{X^2 + 2.25 - X^2}{X^2 + 2.25} = \frac{2.25}{X^2 + 2.25}$$

$$\cos^2\gamma = \frac{2.25}{X^2 + 2.25}, \cos\gamma = \frac{1.5}{\sqrt{X^2 + 2.25}}$$

Thus: $BG$ (numerator) $= \sqrt{X^2 + 2.25} \left(\frac{1.5}{\sqrt{X^2 + 2.25}}\right)$ $BG$ (numerator) $= 1.5$ Recall $BG =$ $$\frac{\left[(\sqrt{X^2 + 2.25}) \sin 90° - \sin^{-1}\left(\frac{X}{\sqrt{X^2 + 2.25}}\right)\right]}{\left[\sin\left[180° - 2\left(90° - \sin^{-1}\left(\frac{X}{\sqrt{X^2 + 2.25}}\right)\right)\right]\right]}$$

thus $BG =$ $$\frac{1.5}{\sin 180° - \sin 180° + \sin 2\left(\sin^{-1}\left(\frac{X}{\sqrt{X^2 + 2.25}}\right)\right)}$$

since $\sin 180° = 0$ $$BG = \frac{1.5}{\sin 2\left(\sin^{-1}\left(\frac{X}{\sqrt{X^2 + 2.25}}\right)\right)}$$

given trigonometric law:

$$\sin 2\gamma = 2 \sin\gamma \cos\gamma$$

-continued $$\text{let } \gamma = \sin^{-1}\left(\frac{X}{\sqrt{X^2 + 2.25}}\right) \text{ then } \sin\gamma = \frac{X}{\sqrt{X^2 + 2.25}}$$

$$\text{then } \sin 2\gamma = \frac{2X}{\sqrt{X^2 + 2.25}}\left(\frac{1.5}{\sqrt{X^2 + 2.25}}\right)$$

$$\sin 2\gamma = \frac{3X}{X^2 + 2.25}, \text{ thus } BG = \frac{1.5}{\frac{3X}{X^2 + 2.25}}$$

$$BG = \frac{X^2 + 2.25}{2X}$$

Thus for each measured distance HJ=X with a 3" wide curvilinear measuring device the radius would be determined by the above relationship. This is for measuring a convex or outside curved surface. This is measured with point Q of FIG. 1 touching the curved surface and the tips 30 and 32 of the slide mechanism also touching the curved surface at points F and H of FIG. 5.

The measured distance for a concave or interior curved surface would be ED of FIG. 5. The formula for determining the radius W once ED is measured is:

$$\text{set } ED = R, \text{ thus } (W - R)^2 + (1.5)^2 = W^2$$
$$W^2 - 2WR + R^2 + 2.25 = W^2$$
$$-2WR + R^2 + 2.25 = 0$$
$$2WR = R^2 + 2.25$$

$$W = \frac{R^2 + 2.25}{2R}$$

This relationship is the same as that for a convex curved surface only the variables are changed to avoid confusion. This measurement would be made with surface 12 of the curvilinear device base touching the concave surface at points A and C and the back tip 28 (FIG. 1) of the slide mechanism (reversed to point towards the front) touching the curved concave surface at point E.

The present invention includes an expansion of the device to make the readout device 18 large enough to include calculation functions to be used as a calculator and to determine (as either an E-PROM burned in function or calculated function) the length of the arc of a measured secant of the measured curved surface according to the following formula:

Measure secant V (see FIG. 5).
The length of arc T intersected by secant V will be:

$$T = \frac{2 \sin^{-1}\left[\frac{\frac{V}{2}}{W}\right] W 2\pi}{360°}$$

The curvilinear measuring device can be made smaller for measuring smaller curved surfaces or larger to measure much larger curved surfaces such as road curves. The small side limit is the dimension of the front throat of the device, which in the preferred embodiment was 3". With this throat size the smallest curved surface that can be measured will be a 3" diameter circle. The largest curved surface to be measured with the 3" wide unit depends on the resolution of the accuracy of the electronics. If the resolution is 0.0001 inches, then the diameter will be:

$$2BG = \frac{X^2 + 2.25}{2X} = \frac{(.0001)^2 + 2.25}{2(.0001)} = 1875 \text{ ft.}$$

If the smallest resolution is 0.0005 inches then the diameter will be 375 ft.

If the device is made with a 12" throat and has a small final resolution of 0.0005 inches, then the largest diameter curved surface would be 6000 ft. The smallest would be 1 ft.

It should be noted in the above formulas that the 2.25 constant which is equal to $1.5^2$ is peculiar to the 3" wide throat device. If different sized throat devices are fabricated, the formulas mentioned above would remain the same except for the change in such constant value, i.e., 2.25.

As an alternative embodiment to the preferred embodiment with the tapered track described hereinabove, the present invention also envisions a geared track design which is somewhat similar to the tapered track embodiment in operation. However, in the geared track design the base unit would include a flat track with a geared track along the inner side. Instead of a spring loaded contact ball, the pickup device would be a small gear on the end of a shaft of a 30-turn potentiometer. The rest of the mechanism would be the same.

As a further alternative to the tapered track embodiment described hereinabove, the present invention also contemplates an embodiment utilizing a magnetically coded design. This embodiment which consists of a magnetically coded strip embedded in the bottom of a flat-bottom base unit track. The pickup device would be a magnetic pickup which communicates digitally with an integrated circuit to change the digital readout.

Although there has been described what are at present considered to be the preferred embodiments of the invention, it will be understood that various modifications and variations may be made therein, and it is intended to cover in the appended claims all such modifications as fall within the true spirit and scope of the invention.

I claim:
1. A curvilinear measuring device comprising:
   first means having a predetermined single unitary substantially flat surface for contacting at at least one first point an external curved item to be measured;
   second means for contacting at at least one second point said external curved item to be measured;
   said second means includes a pair of symmetrically spaced tines at one end thereof, and a single pointed tine at the other end thereof;
   said second means being operably and selectively interconnected with and linearly translatable with respect o said first means in a predetermined direction which is substantially perpendicular to said predetermined single unitary substantially flat surface of said first means;
   third means operably and selectively interconnected with said first and second means for determining the distance between said first and second points in said predetermined direction; and
   said third means is affixed to said second means for linear translation therewith with respect to said first means.

2. A curvilinear measuring device according to claim 1, wherein:
said first means is provided with a tapered track therein; and
said third means includes a pickup device which moves in contact with said tapered track as said second means linearly translates with respect to said first means.

3. A curvilinear measuring device according to claim 1, wherein:
said third means includes a digital readout and a microprocessor.

4. A curvilinear measuring device according to claim 2, wherein:
said third means includes a digital readout and a microprocessor.

5. A curvilinear measuring device according to claim 2, wherein:
said pair of symmetrically spaced tines of said linearly translatable second means are proximal said predetermined single unitary substantially flat surface of said first means when said curvilinear measuring device is being used to measure an exterior curved item which is convex in shape; and
said second means is removed from said first means and reversed end for end so that said pair of symmetrical tines of said second means are distal said predetermined single unitary substantially flat surface of said first means when said curvilinear measuring device is being used to measure an exterior curved item which is concave in shape.

6. A curvilinear measuring device according to claim 3, wherein:
said pair of symmetrically spaced tines of said linearly translatable second means are proximal said predetermined single unitary substantially flat surface of said first means when said curvilinear measuring device is being used to measure an exterior curved item which is convex in shape; and
said second means is removed from said first means and reversed end for end so that said pair of symmetrical tines of said second means are distal said predetermined single unitary substantially flat surface of said first means when said curvilinear measuring device is being used to measure an exterior curved item which is concave in shape.

7. A curvilinear measuring device according to claim 4, wherein:
said pair of symmetrically spaced tines of said linearly translatable second means are proximal said predetermined single unitary substantially flat surface of said first means when said curvilinear measuring device is being used to measure an exterior curved item which is convex in shape; and
said second means is removed from said first means and reversed end for end so that said pair of symmetrical tines of said second means are distal said predetermined single unitary substantially flat surface of said first means when said curvilinear measuring device is being used to measure an exterior curved item which is concave in shape.

8. A curvilinear measuring device according to claim 6, wherein:
said digital readout and said microprocessor include means for locking the measurement displayed by said digital readout and committing it to memory, and include means for selecting display of circumference or diameter functions when such measurement is in memory.

9. A curvilinear measuring device according to claim 4, wherein:
said digital readout and said microprocessor include means for locking the measurement displayed by said digital readout and committing it to memory, and include means for selecting display of circumference or diameter functions when such measurement is in memory.

10. A curvilinear measuring device according to claim 6, wherein:
said digital readout and said microprocessor include means for locking the measurement displayed by said digital readout and committing it to memory, and include means for selecting display of circumference or diameter functions when such measurement is in memory.

11. A curvilinear measuring device according to claim 7, wherein:
said digital readout and said microprocessor include means for locking the measurement displayed by said digital readout and committing it to memory, and include means for selecting display of circumference or diameter functions when such measurement is in memory.

12. A curvilinear measuring device according to claim 1, wherein:
said pair of symmetrically spaced tines of said linearly translatable second means are proximal said predetermined single unitary substantially flat surface of said first means when said curvilinear measuring device is being used to measure an exterior curved item which is convex in shape; and
said second means is removed from said first means and reversed, end for end, so that said pair of symmetrically spaced tines of said second means are distal said predetermined single unitary substantially flat surface of said first means when said curvilinear measuring device is being used to measure an exterior curved item which is concave in shape.

13. A curvilinear measuring device comprising:
first means having a predetermined single unitary substantially flat surface for contacting at at least one first point an external curved item to be measured;
said first means being provided with a tapered track therein;
second means for contacting at at least one second point said external curved item to be measured;
said second means being operably and selectively interconnected with and linearly translatable with respect to said first means in a predetermined direction which is substantially perpendicular to said predetermined single unitary substantially flat surface of said first means; and
third means operably selectively interconnected with said first and second means for determining the distance between said first and second points in said predetermined direction;
said third means including a pickup device which moves in contact with said tapered track as said second means linearly translates with respect to said first means;
said third means including a digital readout and a microprocessor.

14. A curvilinear measuring device according to claim 13, wherein:
said digital readout and said microprocessor include means for locking the measurement displayed by said digital readout and committing it to memory, and include means for selecting display of circumference or diameter functions when such measurement is in memory.

15. A curvilinear measuring device comprising:
first means having a predetermined single unitary substantially flat surface for contacting at at least one first point an external curved item to be measured;
second means for contacting at at least one second point said external curved item to be measured;
said second means being operably and selectively interconnected with and linearly translatable with respect to said first means in a predetermined direction which is substantially perpendicular to said predetermined single unitary substantially flat surface of said first means; and
third means operably and selectively interconnected with said first and second means for determining the distance between said first and second points in said predetermined direction;
said third means including a digital readout and a microprocessor;
said digital readout and said microprocessor including means for locking the measurement displayed by said digital readout and committing it to memory, and including means for selecting display of circumference or diameter functions when such measurement is in memory.

* * * * *